United States Patent [19]

Uchida

[11] Patent Number: 4,851,074

[45] Date of Patent: Jul. 25, 1989

[54] AUTOMATIC TRANSFERRING DEVICE FOR DOUBLE-COATED ADHESIVE TAPE

[76] Inventor: Hiromichi Uchida, c/o Toyo Chemical Co., Ltd. Nikko Mita Bldg., 4-26, Takanawa 1-chome, Minato-ku, Tokyo, Japan

[21] Appl. No.: 54,954

[22] Filed: May 27, 1987

[51] Int. Cl.[4] .......................... B32B 35/00; B65H 5/28

[52] U.S. Cl. .................................... 156/541; 156/577; 156/579

[58] Field of Search ............... 156/584, 541, 574, 577, 156/579; 221/72, 73; 225/51

[56] References Cited

U.S. PATENT DOCUMENTS 2,676,765 4/1954 Kaplan ................................ 156/584
4,220,495 9/1980 Uchida ................................ 156/584
4,267,006 5/1981 Karn ................................... 156/541
4,396,455 8/1983 Uchida ................................ 156/584
4,447,482 5/1984 Heinzelman ........................ 156/584

*Primary Examiner*—Michael W. Ball
*Assistant Examiner*—J. Davis
*Attorney, Agent, or Firm*—Wenderoth, Lind & Ponack

[57] ABSTRACT

An automatic transferring device for double-coated pressure sensitive adhesive tape, capable of transferring the adhesive substance of a roll to a desired position, operates in a simple and positive manner. The tape transferring devices holds and dispenses a roll of double-coated adhesive transferring tape coated with a pressure sensitive adhesive substance on one face of the double-sided released paper.

5 Claims, 3 Drawing Sheets

AUTOMATIC TRANSFERRING DEVICE FOR DOUBLE-COATED ADHESIVE TAPE

BACKGROUND OF THE INVENTION

This type of the double-coated adhesive tape has been increasingly and widely used in recent years, because it is capable, unlike conventional double-coated adhesive tape, to have the adhesive effect only by the adhesive substance with no core material and because ideal adhesive results can be obtained by the property of adhesive substance only.

In the following, an example of this invention is explained with reference to the accompanying drawings:

In FIG. 8, 101 indicates a transferring device, comprising a tape roll support shaft 103 mounted in a casing 102, on which a tape roll 106 is rotatably supported. The tape roll takes up a double-coated adhesive transferring tape, wherein pressure sensitive adhesive substance 105 is coated on one face 104*a* of the double-sided released paper 104. The tape is rolled on the tape roll support shaft in such manner that the surface coated with the adhesive substance faces outward. Further, a pressure plate 107 similar to a plate spring is mounted inside the casing 102 in the direction opposite to the rotating direction of said tape roll, applying the braking force in such degree as to block free rotation of said tape roll 106. In this figure, 108 shows an exposed portion of the tape, and 109 is an outlet of the double-coated released paper 104, on which the adhesive substance 105 has been released and transferred.

The automatic transferring device for the double-coated adhesive transferring tape with the construction as explained above causes no particular problem so far as the user applies an even force on tape surface and presses it positively on the article to be transferred unless the double-sided released paper is slackened and caught in the space under the outlet of said released paper as shown in FIG. 8. However, if tape is run with its surface inclined, the adhesive substance is forced to remain on the double-sided released paper, blocking the smooth contact rotation thereof with the pressure plate or obstructing the discharge of the released paper from the outlet. For this reason, it is necessary to acquire a sort of skill until the user becomes able to use it without trouble. Because the pressure plate is disposed to the direction opposite to the rotating direction of the double-sided released paper, the tape roll receives relatively big resistance during rotation. This is often likely to cause the slackening of the tape even when the adhesive substance remaining on the double-sided release paper does not stick. The slackening further causes the tape to sag and hinders the rotation of the tape at the position, where it contacts with the pressure plate, which faces opposite to the rotating direction of the tape roll, making it impossible to transfer the adhesive substance in the smooth and constant conditions. In addition, it is extremely difficult to have the casing straightly faced toward the surface to be transferred. When it is run in inclined position, the adhesive substance is not uniformly transferred to the desired surface, and the adhesive effects are not obtained as desired.

There have been the following problems in the double-coated adhesive transferring tape itself, used in the automatic transferring device for this type of adhesive tape:

In recent years, double-coated adhesive transferring tape has been extensively used, wherein a sheet of double-sided released paper is coated with adhesive film and is rolled up in the shape of a tape roll. Compared with the conventional type of double-coated adhesive transferring tape, using a core material, this new type of double-coated adhesive transferring tape is a simple but ideal type of tape, while the following problems still remain unsolved:

Because adhesive substance film is coated all over the upper surface of the double-sided released paper, the adhesive substance tends to protrude to both sides when the paper is rolled up into the shape of tape. For instance, when this tape roll is used within the casing of the automatic transferring device, the protruding adhesive substance sticks to the inner surface of the casing and hinders the smooth and perfect rotation and feeding of the double-coated adhesive transferring tape. At the same time, the adhesive substance stuck on inner surface of the casing is often separated, resulting in the pressure sensitive transfer of the double-coated adhesive transferring tape, which now partically lacks the adhesive substance. In the course of transition and adhesion to the desired position of this type of double-coated adhesive transferring tape, the adhesive tape is cut off by strongly pressing the automatic transferring device and by raising it to the desired position. This requires, however, a considerable degree of skill and force, and fatal defects are often caused such as the defect, wherein the tape is not properly cut off at the desired position, resulting in the raising of the tape together with the automatic transferring device and in the separation of the stuck portion of the tape, or the defect, wherein the desired end portion is not disposed in good order. In order to eliminate such defects, it was proposed to arrange the pieces (patches) of adhesive substance consisting of adhesive film on the double-coated released paper—lengthwise in the continuous manner each with a certain intermediate space—where the double-coated released paper was sometimes exposed in the longitudinal direction. According to the present improvement, the adhesive tape is incorporated in the automatic transferring device as a tape roll and is used as a direct pressure sensitive roller. Because adhesive substance is not coated in the intermediate space between the patches of the adhesive substance, the disadvantageous condition of the tape is now eliminated, where the tape could not be cut off even when it is strongly pressed and then pulled up. The desired width of the double-coated adhesive transferring tape can now be transferred and adhered in simple manner. At the same time, the adhesive substance can be transferred and adhered to the desired end portion, and there is no possibility that the adhesive substance is turned to liquid state or it becomes uneven in thickness as often experienced in the prior method of pressing and cutting.

Even in this type, however, there remains the possibility that the adhesive substance may protrude from the sides when the tape roll is placed in the automatic transferring device and that it sticks to the inner surface of the automatic transferring device, hindering the perfect rotation and feeding of the tape because the adhesive substance is coated on the upper side and lower side of the patches of adhesive substance in the longitudinal direction.

SUMMARY OF THE INVENTION

The present invention brings an improvement to the double-coated adhesive transferring tape itself. At the same time, it aims to offer an automatic transferring device for the double-coated adhesive transferring tape, enabling even unskillful and inexperienced users to perform the proper transferring operation and suitable to store in adequate manner when it is not in use. For this purpose, various ideas and means have been added for the automatic transferring device for the double-coated adhesive transferring tape, where the double-sided released paper coated with the transferred adhesive substance is smoothly guided toward the outlet and discharged in order to prevent the slackening of the double-sided released paper within the casing. Even when the adhesive substance may remain on the double-sided released paper, the double-sided released paper is discharged without any trouble. Because the tape roll is rotated properly and the transferring operation is performed in a suitable direction, there is no possibility that the adhesive substance is not transferred in good order to the desired position even when the tape is run in an inclined position. Thus, the feeding of the release paper as well as the transfer of the adhesive substance to the desired surface are conducted positively and properly.

DETAILED DESCRIPTION OF THE EMBODIMENTS

In the following, an embodiment of the present invention is described with reference to the accompanying drawings.

Figure 1:
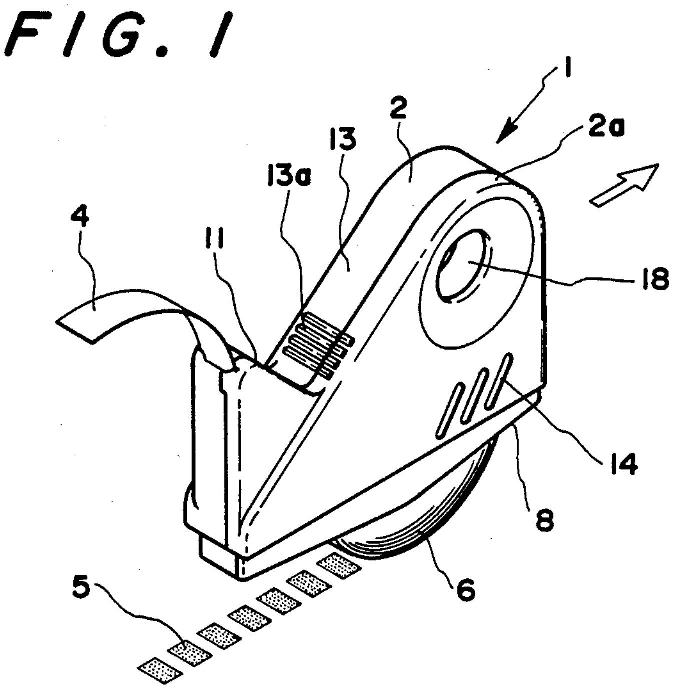
FIG. 1 shows a perspective view of the automatic transferring device for the double-coated adhesive transferring tape based on an embodiment of the present invention, and FIG. 2 gives the front view of the automatic transferring device with its cover opened for the double-coated adhesive transferring tape as shown in FIG. 1.
Figure 2:
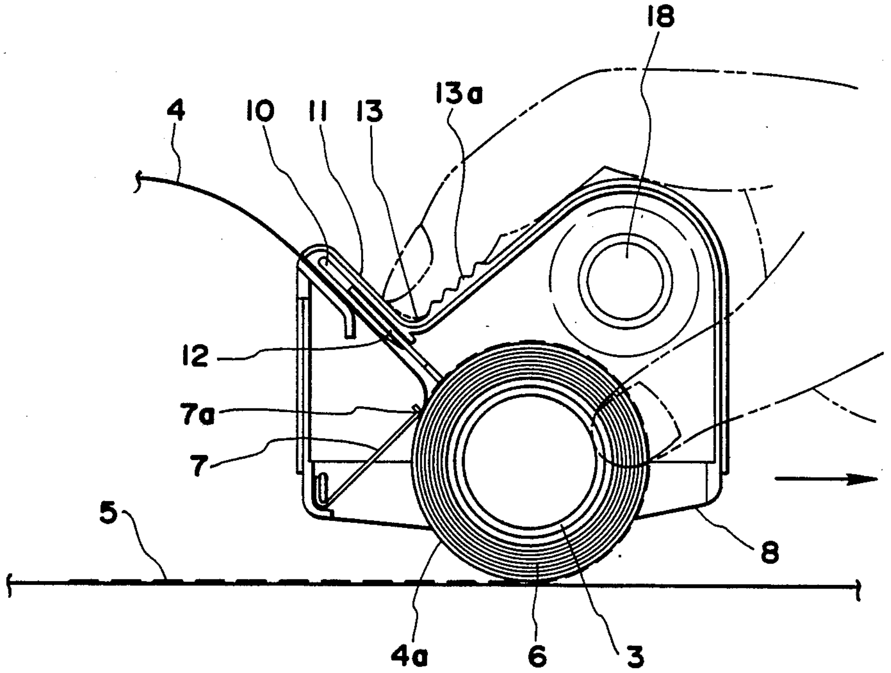
Figure 3:
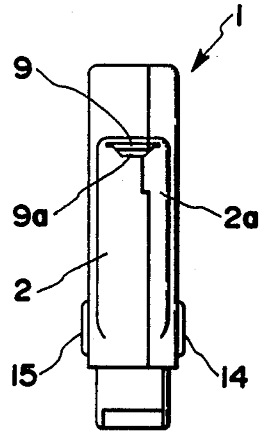
FIG. 3 gives the left side view of the automatic transferring device for the double-coated adhesive transferring tape as shown in FIG. 1.
Figure 4:
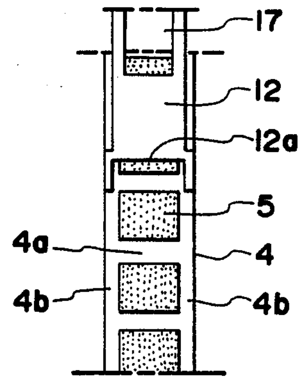
FIG. 4 is a partial enlarged view of the free contact piece.
Figure 5:
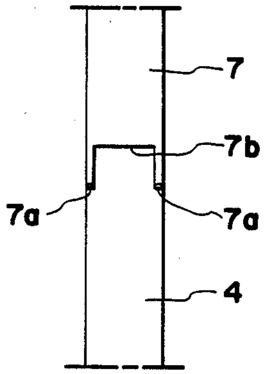
FIG. 5 is a partial enlarged view of a portion of the pressure plate.
Figure 6:
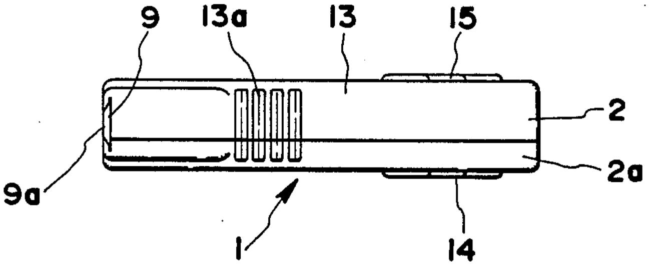
FIG. 6 is a plan view of the automatic transferring device for the double-coated adhesive transferring tape, and FIG. 7 gives a perspectively view of the guide piece, which accommodates the free contact piece.

In FIGS. 1 through 7, 1 shows a transferring device. In this transferring device, a tape roll support shaft 3 is mounted in a casing 2 provided with a cover 2*a*. As shown in FIG. 4, the pieces (patches) of pressure sensitive adhesive substance 5 are coated on one face 4*a* of the double-sided released paper. A tape roll 6 is rotatably supported on the support shaft by rolling up the double-coated adhesive transferring tape in such manner that the dry edge portion 4*b* is formed with no adhesive substance on upper and lower sides of the double-sided release paper 4 in the longitudinal direction. As shown in FIG. 5, a pressure plate 7 similar to a plate spring, having a notch 7*b* to avoid the contact of the contact piece 7*a* with the adhesive substance 5, is provided inside said casing 2. The pressure plate is in contact only with the dry edge portion 4*b* of said double-sided released paper 4 in order to block the free rotation of said tape roll 6. The pressure plate controls the discharging direction of the released paper and, at the same time, applies braking force in such degree as to prevent the free rotation of said tape roll 6. In the drawings, 8 shows an exposed portion of the tape, and 9 is an outlet for the double-sided release paper, having a notch 9*a* to avoid contact with the remaining adhesive substance. It is provided on the surface 4*a* coated with adhesive substance 5 of said double-sided released paper 4 in the same manner as said pressing plate 7 to discharge the double-sided release paper 4 already coated with the adhesive substance 5. 10 is a guide piece, having the shape of a groove or a slot, as provided inside the protruding portion 11 located at the position more advanced toward the rotating direction of the tape roll than said outlet 9 of the casing 2. This guide piece 10 accommodates a free contact piece 12, made of relatively heavy material such as iron to enable free falling toward said tape roll by its own weight. It is furnished with a notch 12*a* to avoid the contact with the adhesive substance in the same manner as said pressing plate 7. Accordingly, it not only gets in touch with the patches of the adhesive substance, as produced by the rotation, but also plays the role of a stopper. This eliminates the possibility that the released paper is slackened and caught in the space inside the casing as the tape roll is rotated.

13 is an index finger placing plate and consists of the lower part of the protruding portion 11 and a plate adjacent to it, inclined upward toward the upper surface of the casing. The index finger placing plate 13 is provided with protuberances or indentations 13*a* to catch the finger.

Figure 7:
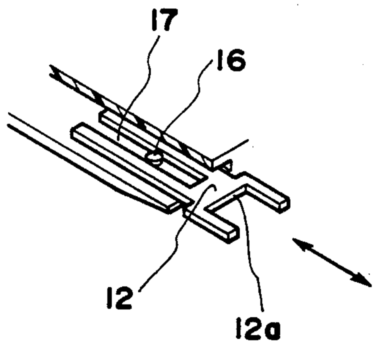
Figure 8:
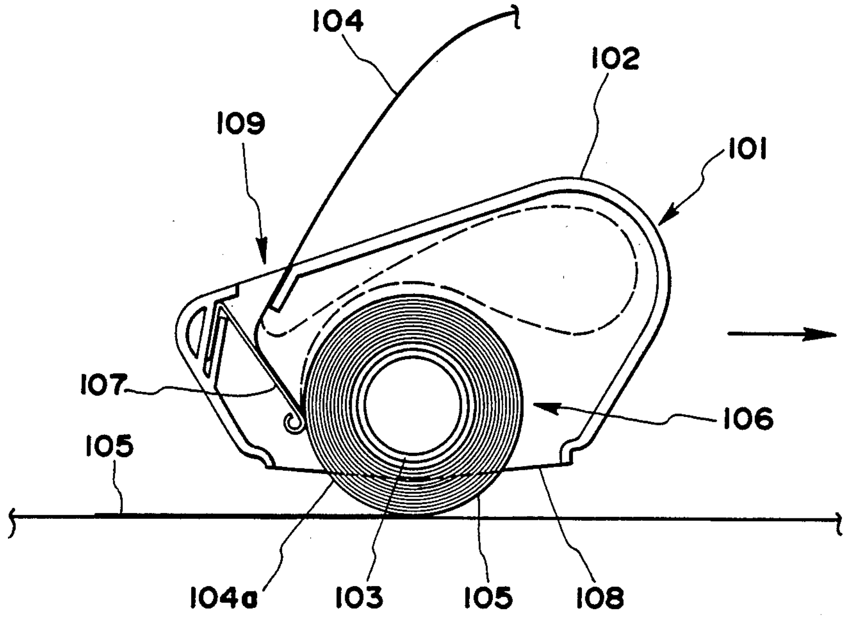
PRIOR ART FIG. 8
FIG. 8 is a sectional view, showing the structure of a conventional automatic transferring device for the double-coated adhesive transferring tape.

14 and 15 are the protuberances or indentations, provided on both sides of the lower portion of the casing in the direction of transfer and are used to catch the thumb or middle finger. By holding the casing with thumb, index and middle finger at these positions, the transfer operation can be performed perfectly because tape surface is straightly faced toward the surface to be transferred and the tape is run in the inclined position, and there is no possibility that the adhesive substance is not transferred to the desired position in good order. When necessary, the guide piece may have the structure as shown in FIG. 7. In FIG. 7, 16 is a protuberance as formed on the side of the guide piece, which has the shape of a groove or a slot. The protuberance is positioned in the notched groove 17, which is formed at the end of the free-falling free contact piece, hindering it from dropping off in a lateral direction when the cover is removed to replace the tape.

18 is an opening on the casing for hanging purpose to use when the automatic transferring device for double-coated adhesive tape is stored or left unused.

The automatic transferring device for double-coated adhesive transferring tape based on the above-mentioned structure can offer perfect rotation for the tape roll. It is so designed that the tape itself is provided with the dry edge portion without adhesive substance on upper and lower sides in longitudinal direction of the double-sided released paper, making the width of the coated adhesive substance on the double sided released paper smaller than the width of said double-sided released paper. A guide piece having the shape of a groove or a slot is provided within the protubernce on upper and inner side of the casing at the position more advanced toward the rotating direction of the tape than the outlet. A free contact piece made of material with relatively heavy weight such as iron is furnished inside the guide piece so that it falls down freely in the direction of the tape roll by its own weight. This free contact piece is provided with a notch so that it gets in touch only with the dry edge portion and not with the adhesive substance of the rotating tape roll. Thus, the automatic transfer device can perform perfect rotation effect for the tape roll. At the same time, the double-sided released paper coated with the adhesive substance can also be guided and discharged in proper manner toward and through the outlet by the stopper action and the guide action of said free contact piece, which rolls up the released paper into the casing. On the pressure plate similar to a spring, hindering the free rotation of the tape roll, a notch is provided to press only the dry edge portion and not the adhesive substance. In the same way, a notch is furnished on the surface of the outlet. The notch makes it possible to discharge the double-sided released paper without trouble even when adhesive substance remains on the double-sided released paper. In case the pressure plate similar to a spring, hindering the free rotation of said tape roll, is mounted to the same direction as the rotating direction of said tape roll, almost no resistance occurs against the forced rotation of the tape roll. Thus, tape is not slackened and tape roll is rotated very smoothly, resulting in perfect transfer operation of the adhesive substance in stabilized and assured manner.

Another advantageous feature of the present invention is the positioning of middle finger, thumb and index finger, facilitating to hold the casing straightly toward the surface to be transferred. This makes it possible to prevent the tape from running in the inclined position and to transfer the adhesive substance to the desired position in good order.

This eliminates the possibility that the tape may be run in the inclined position, that the adhesive substance may not be transferred to the desired position in good order and that the adhesive effect may not be conducted as desired.

More convenience is provided in the replacement of tape roll, because the dropping-off of the free contact piece toward lateral direction is prevented. An opening is furnished to hang the casing when not in use, and the device can be hung or suspended on the hook or by other means mounted on the side of the desk or on wall when it is not used.

I claim:

1. A device for automatically transferring a double-coated adhesive transfer tape of the type having adhesive substance to be transferred coated on a release material in a discontinuous manner such that portions of the adhesive substance are separated by small intermediate spaces in the longitudinal direction, and longitudinal edge portions of the release material are not coated with the adhesive substance, leaving portions of the release material exposed on upper and lower sides of the release material, said device comprising:

a substantially hollow casing;

means for rotatably supporting a roll of double-coated adhesive transfer tape, said support means located inside said casing;

a resilient pressure plate for contacting the roll of tape for hindering the free rotation thereof, said pressure plate having first and second ends, said first end attached to said casing, and said second end of said pressure plate having means for contacting only the longitudinal edge portions of the release material not coated with the adhesive substance;

an opening in a lower part of said casing for exposing at least the patches of adhesive substance on the roll of tape rotatably supported on said support means outwardly of said casing for transferring the adhesive substance to a substrate;

an outlet in said casing for discharging the release material from which the adhesive substance has been transferred to a substrate;

a guide piece provided on said casing having a groove or slot directed toward the tape roll; and a free contact piece slidably received in said groove or slot of said guide piece, said free contact piece contacting the tape roll for preventing slack in the release material of the transfer tape from which the adhesive substance has been transferred.

2. A device as in claim 1, wherein said outlet in said casing for discharging the release material has means for contacting only the longitudinal edge portions of the release material not coated with the adhesive substance.

3. A device as in claim 1, wherein said guide piece is provided on an upper forward portion of said casing, and a finger placing plate having at least two protuberances or indentations is provided on said casing rearwardly and below said guide piece.

4. A device as in claim 1, wherein said guide piece has a protuberance for slidably retaining said free contact piece within said groove or slot of said guide piece when no roll of tape is rotatably supported on said support means.

5. A device as in claim 1, wherein said casing has an opening for hanging said device when not in use.

* * * * *